(12) United States Patent
Haussmann (10) Patent No.: US 6,539,746 B1
(45) Date of Patent: Apr. 1, 2003

(54) HIGH PRESSURE GAS COOLER FOR A REFRIGERANT CIRCUIT OF A MOTOR-VEHICLE AIR-CONDITIONING SYSTEM

(75) Inventor: Roland Haussmann, Leimen (DE)

(73) Assignee: Valeo Klimatechnik GmbH, Hockenheim (DE)

( * ) Notice: Subject to any disclaimer, the term of this patent is extended or adjusted under 35 U.S.C. 154(b) by 0 days.

(21) Appl. No.: 09/552,966

(22) Filed: Apr. 20, 2000

(30) Foreign Application Priority Data

Apr. 23, 1999 (DE) .......................................... 199 18 617

(51) Int. Cl.⁷ .............................................. F25B 41/00
(52) U.S. Cl. ............................ 62/513; 62/503; 62/509
(58) Field of Search ......................... 62/507, 509, 513, 62/503, 113

(56) References Cited

U.S. PATENT DOCUMENTS 3,131,553 A * 5/1964 Ross ........................... 62/513
6,105,386 A * 8/2000 Kuroda et al. ................ 62/513

* cited by examiner

*Primary Examiner*—William E. Tapolcai
*Assistant Examiner*—Mohammed M. Ali
(74) *Attorney, Agent, or Firm*—Morgan & Finnegan LLP (57) ABSTRACT

A high pressure gas cooler for a motor-vehicle air-conditioning system, the refrigerant circuit having, in the flow direction of the refrigerant, a compressor, the gas cooler, an inner heat exchanger exchanging heat between the high-pressure and low-pressure sides, a throttle device, an evaporator and a manifold on the low-pressure side, which communicates via the low-pressure side of the inner heat exchanger with the intake side of the compressor. The gas cooler is combined with the inner heat exchanger and/or the manifold on the low-pressure side to form a single unit.

44 Claims, 6 Drawing Sheets

HIGH PRESSURE GAS COOLER FOR A REFRIGERANT CIRCUIT OF A MOTOR-VEHICLE AIR-CONDITIONING SYSTEM

FIELD OF THE INVENTION

The invention relates to a high pressure gas cooler for a refrigerant circuit of a motor-vehicle air-conditioning system, and more particularly but not exclusively to a gas cooler for supercritical $CO_2$ refrigerant circuit.

BACKGROUND OF THE INVENTION

The underlying technology and problems of such a gas cooler are described in detail in the offprint by Jürgen Wertenbach, Jürgen Maué and Wolfgang Volz "$CO_2$ Refrigeration Systems in Automobile Air-Conditioning". In this case, according to FIG. 2 of this offprint, reference is made to the so-called RACE project. The invention deals with a further development of the result of this RACE project; the features to which the invention relates in the preamble of claims 1 to 3 are presented in FIG. 4 of this offprint.

In brief, problems are encountered in the configuration of a motor-vehicle climate-control system when the intention is to replace the old refrigerants, for example R134a which is generally used in the case of motor-vehicle air-conditioning systems, by carbon dioxide, amongst other things in order to reduce the greenhouse effect. In the scope of the aforementioned RACE project, it has been found that, when $CO_2$ is used as the refrigerant, the best efficiency can be obtained with the circuit according to FIG. 4 of the cited offprint. In comparison with known motor-vehicle air-conditioning systems which use conventional refrigerants, an inner heat exchanger exchanging heat between the high-pressure and low-pressure sides is added as a new component. While, further, in the case of conventional refrigerant circuits, manifolds can equally well be used on the low-pressure side and on the high-pressure side, a manifold on the low-pressure side is preferred for reasons of optimum efficiency in the operating mode to which the invention relates. For details, reference is again expressly made to the offprint indicated above.

The object of the invention is to make it possible to accommodate the following aspects at least individually, but as far as possible in combination or in totality:

1. There should be the fewest possible pressure-proof lines needed for high-pressure operation. Reducing the number of pressure-proof connecting lines also leads in this regard to fewer screw connections of these connecting lines; such screw connections are needed not only because of the high-pressure operation, but also because $CO_2$ diffuses into conventional tube connections, in which elastomer seals are employed, and this can lead to explosive eruptions of the elastomer sealing means.

2. The new element, an inner heat exchanger, should as far as possible not increase the installation space required in the motor vehicle at all, or at most slightly.

3. The general use of a manifold on the low-pressure side should in this regard be accommodated so as to save space and cost.

4. The arrangement should be organized so that, in an existing motor vehicle which is still equipped with a conventional motor-vehicle air-conditioning system, the installation space can also be utilized for an air-conditioning system having the elements needed for operation with $CO_2$, by replacing the corresponding components.

SUMMARY OF THE INVENTION

According to one aspect of the invention there is provided a high pressure gas cooler for a motor-vehicle air-conditioning system having a refrigerant circuit comprising, in the flow direction of the refrigerant, the gas cooler, an inner heat exchanger operable. to exchange heat between the high-pressure and low-pressure sides, wherein the gas cooler and the inner heat exchanger are combined to form a single unit.

According to another aspect of the invention there is provided a high pressure gas cooler for a high-pressure refrigerant circuit of a motor-vehicle air-conditioning system, the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit.

According to a third aspect of the invention there is provided a high pressure gas cooler for a refrigerant circuit of a motor-vehicle air-conditioning system, the refrigerant circuit having, in the flow direction of the refrigerant, the gas cooler, an inner heat exchanger exchanging heat between the high-pressure and low-pressure sides, and a manifold on the low-pressure side, which communicates via the low-pressure side of the inner heat exchanger with the intake side of the compressor, wherein the gas cooler and the manifold on the low-pressure side are combined to form a single unit.

Certain dependent claims, for example claims 2 to 4, concern a basic structure of the gas cooler according to the invention which is preferred both in terms of production, compactness and using the same component parts, with further dependent claims, for example claim 5, covering further standardization of the components.

The "first" heat-exchange tubes of the gas cooler are in principle ribbed; claims such as claim 6 however cover embodiments where the inner heat exchanger can be configured entirely without ribbing while obtaining an especially compact unit.

As previously, in the case of conventional motor-vehicle air-conditioning systems, heat exchangers employing flat tubes are preferably used, see for example claim 7.

Depending on whether these flat tubes communicate with the low-pressure side or the high-pressure side, they are expediently arranged with differing lengths of their ends, so as hence to have the option of connecting to different chambers for the low-pressure side and the high-pressure side.

Alternative embodiments allow the flat tubes having shorter lengths of their free ends to have refrigerant applied to them.

Claims 12 to 14 concern preferred design embodiments of the manifold of the inner heat exchanger.

While the embodiments claimed so far deal with the basic concept of claim 1, which is also contained in claim 15, claims 40 to 44 concern further developments of claim 39, which is likewise included in claim 15.

According to claim 40, use is firstly made of arranging the manifold on the low-pressure side along the bank of "first" heat-exchange tubes of the gas cooler, that is to say transversely with respect to these heat-exchange tubes, while the inner heat exchanger should in fact preferably be arranged at the end side on the bank of the gas cooler, that is to say essentially with the same alignment of its "second" heat-exchange tubes.

As claimed in claim 41, an intermediate channel is in this case provided between the gas cooler and the manifold and, according to whether the inner heat exchanger is arranged above or below the gas cooler, this channel carries out the necessary flow-related interconnection of the refrigerant with minimal design outlay and hence saves on external lines for the $CO_2$ refrigerant by integrated line routing. Claims 42 and 43 concern preferred further developments in relation to this. In this regard, claim 43 is distinguished in that accumulation of compressor lubricant which has entered is avoided by the simplest of means, while optionally even avoiding a known immersed line (cf offprint from Volkswagen AG "RACE Project—Final Technical Task Report of Tasks 7, 15 and 16" by Dr H. Röhe, B. Adiprasito and Dr U. Brennenstuhl of Jul. 17.07.1997, in particular FIG. 1).

Claim 44 gives a general formulation of two basic principles which have already identified above, and which according to the invention should be satisfied as far as possible.

BRIEF DESCRIPTION OF THE DRAWINGS

The invention will be explained in more detail below with the aid of diagrammatic drawings with reference to several illustrative embodiments.

DESCRIPTION OF THE PREFERRED EMBODIMENTS

In the various figures, like reference numerals are given to like parts.

Figure 1:
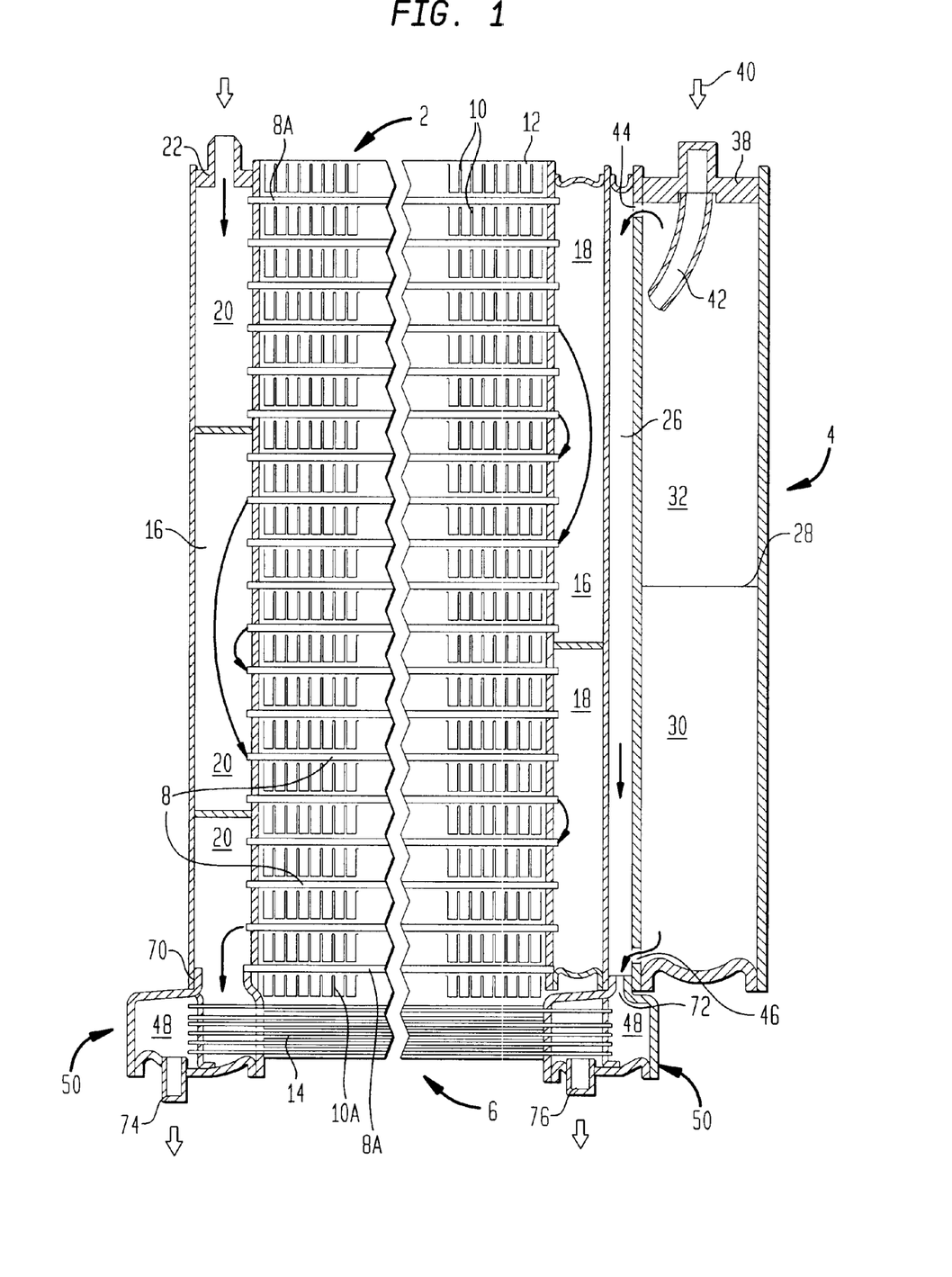
FIG. 1 and FIG. 2 show a longitudinal section in cutaway representation of a first and a second embodiment of a gas cooler, which is combined both with an inner heat exchanger and with a manifold on the low-pressure side to form a single unit.
Figure 2:
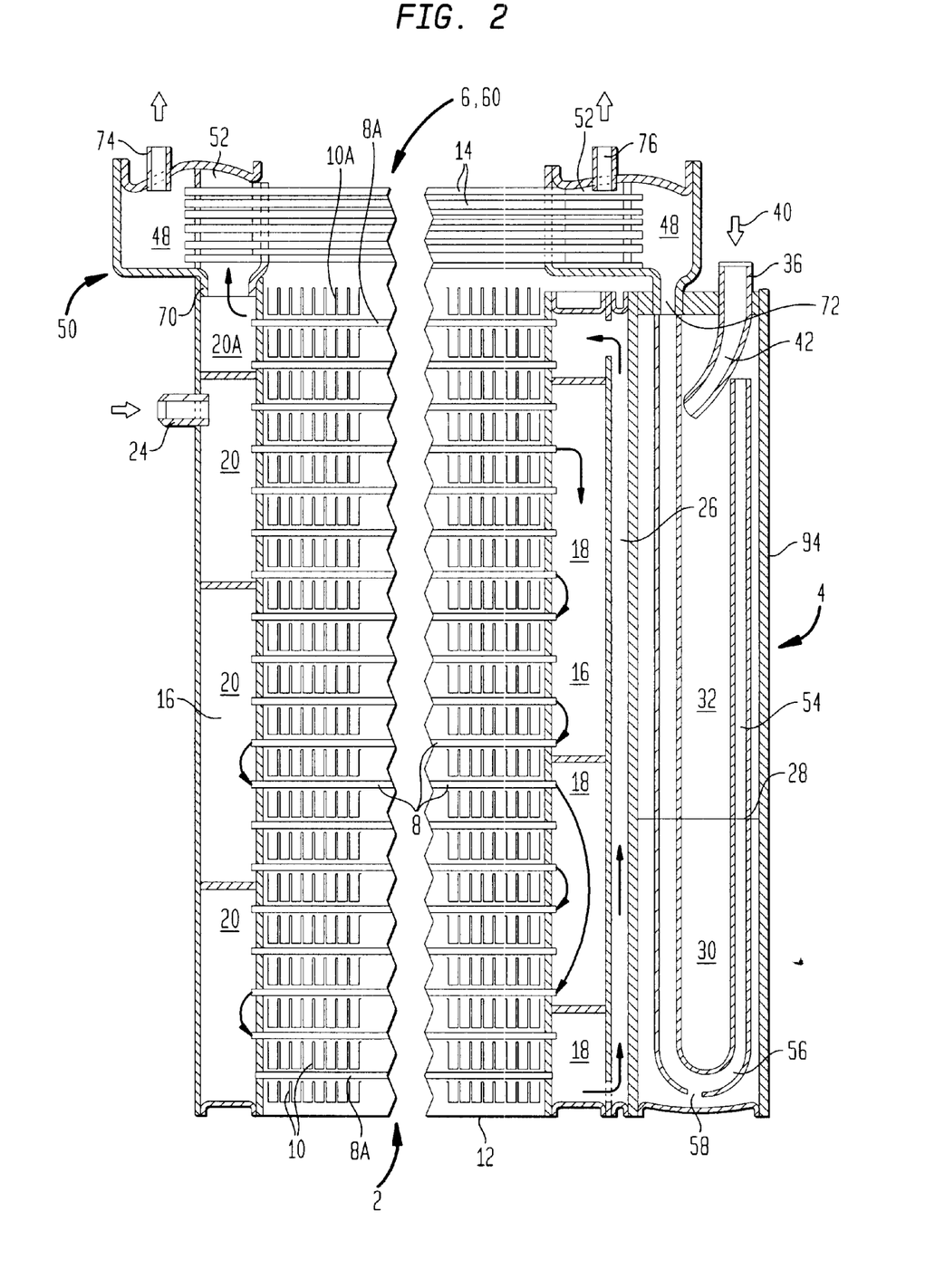

A gas cooler 2 and a manifold 4 on the low-pressure side are arranged identically in the alternative embodiments of a unit according to FIGS. 1 or 2. The arrangements of the two embodiments differ, in particular, in that an inner heat exchanger 6 is included in the unit at a lower end side, in the normal installation position in a motor vehicle, in the embodiment according to FIG. 1, but at the upper end side of the gas cooler 2 in FIG. 2. In the embodiment according to FIG. 2, the gas phase of the refrigerant is in this case removed from the manifold on the low-pressure side through an immersed tube, which is not needed in the embodiment according to FIG. 1. In both cases, the unit is made of aluminum or an aluminum alloy, and optionally of combinations of such materials.

In both embodiments of FIGS. 1 and 2, the gas cooler 2 has a bank of first heat-exchange tubes 8 which are designed as flat tubes having flat sides facing one another. Zigzag sheets 10, hard-soldered to the heat-exchange tubes 8, are interposed between these flat sides. Further, a corresponding zigzag sheet 10a is also connected in each case by hard soldering to the two last flat tubes 8a on the end sides, and the one on the end side remote from the inner heat exchanger 6 is also covered by a likewise hard-soldered closing plate 12.

The inner heat exchanger 6, for its part, consists of a stack, directly brazed to one another, of second heat-exchange tubes 14 having alternately different length, as will be explained in more detail below. The second heat-exchange tubes 14 are also flat tubes. The two neighboring flat tubes, 14 of the inner heat exchanger 6 and 8a of the gas cooler 2, are connected to one another via one of the zigzag sheets 10a by hard soldering.

The first heat-exchange tubes 8 and the second heat-exchange tubes 14 are identically designed flat tubes.

The two ends of the flat tubes 8 of the gas cooler respectively open into a distribution or manifold tube 16, which are respectively subdivided into several chambers 18 and 20 lying on top of one another. The chambers 18 of one distribution or manifold tube 16 are mutually offset, in relation to the chambers 20 of the other distribution or manifold tube 16, so that a flow, progressing to and fro in the longitudinal direction of the gas cooler along the arrows indicated, takes place between them through respective groups of several first heat-exchange tubes 8 in the manner of a cross-current heat exchanger, and, to be precise, in each case upward in the gas cooler in the represented normal installation position in the motor vehicle. The refrigerant is hence supplied "at the top" in each case, and, to be precise, at an end-side connection adaptor 22 on the end side remote from the inner heat exchanger 6 in the embodiment according to FIG. 1, and at a circumferential-side connection adaptor 24 in proximity to the inner heat exchanger 6 in the embodiment corresponding to FIG. 2. In both embodiments, the manifold 4 on the low-pressure side extends along the gas cooler 2, and according to FIG. 5 in both embodiments of FIG. 1 and FIG. 2 this manifold is joined via an intermediate channel 26 to a neighboring distribution or manifold tube 16 with integral manufacturing, e.g. as an extruded, die-cast or pressed part. A level 28 between the liquid phase 30 and the gaseous phase 32 is indicated in the manifold container on the low-pressure side.

In both embodiments of FIGS. 1 and 2, refrigerant coming from the evaporator 34 (cf description of FIG. 4) of the refrigerant circuit and still containing a liquid phase fraction in its gas phase, is introduced through a connection adaptor 36 on an upper cover 38 of the manifold 4 on the low-pressure side, into the latter along the arrow 40, and is delivered through a curved line 42 toward the cylindrical inner wall of the manifold 4 on the low-pressure side, in such a way that a spiraling downward flow of the refrigerant takes place with the liquid component being led off downward on this inner wall of the manifold 4 on the low-pressure side.

In the embodiment according to FIG. 1, the refrigerant freed of the liquid phase is introduced into the intermediate channel 26 through an upper opening 44. Further, a lower opening 46 which likewise leads to the intermediate channel 26 is provided on the manifold 4 on the low-pressure side; this opening is dimensioned so that lubricating oil which has accumulated at the bottom of the manifold, together with a small amount of liquid phase of the refrigerant which is used only for transport, can be removed into the intermediate channel 26. The lower end of the intermediate channel 26 communicates with the low-pressure side 48 of a manifold 50 of the inner heat exchanger 6 (cf subsequent description of the inner heat exchanger 6, which in this respect is again identical in the two illustrative embodiments of FIGS. 1 and 2).

The general purpose of the manifold 4 on the low-pressure side is to separate off and collect the liquid phase of the refrigerant which is supplied, and to deliver only the gaseous phase to the low-pressure side 48 of the inner heat exchanger 6.

In the first embodiment corresponding to FIG. 1, this delivery takes place through the upper opening 44 above the level 18 of the liquid phase ("downward") through the intermediate channel 26. The lower opening 46 may be closed for the refrigerant circuit itself, and used only to prevent excessive build-up of a liquid phase, enriched with lubricating oil, which accumulates at the bottom in the manifold 4 on the low-pressure side, but to allow it always to be discharged back through the lower opening 46. To the extent that any liquid phase of the refrigerant is itself taken along as well here, this is intrinsically undesired and is of practical use only as a means of transport for the lubricating oil entrained downward in the intermediate channel 26. In other regards, the level 28 between the gaseous phase 32 and the liquid phase 30 in the manifold 4 on the low-pressure sides varies according to the filling of the refrigerant circuit and the operating conditions of the motor vehicle.

Functionally, the second embodiment according to FIG. 2 is basically identical, but needs to be modified with a view to arranging the inner heat exchanger 6 at the top on the gas cooler 2.

The intermediate channel 26 is used here to feed refrigerant which is under high pressure back "upward" from the bottom chamber 18 of the distribution or manifold tube. It is then introduced through a group of first heat-exchange tubes 8a and 8b into the top chamber 20a above the chamber 20 provided with the connection adaptor 24, and delivered from there into the high-pressure side 52 of the manifold 50 of the inner heat exchanger 6.

In contrast to the embodiment of FIG. 1, in the embodiment of FIG. 2 an immersed tube 54 is arranged inside the manifold 4 on the low-pressure side, and this tube dips into the liquid phase 30 of the manifold 4 on the low-pressure side until it is near the base of the latter, takes in the gaseous phase of the refrigerant, separated from the liquid phase, from the upper side of the manifold 4 on the low-pressure side above the opening of the line 42 and, reversing the flow direction, feeds it into the low-pressure side 48 of the inner heat exchanger 6 (in the case of the embodiment of FIG. 1, this takes place without the immersed tube through the upper opening 44 and the intermediate channel 26).

At the bottom of the U-bend 56 of the immersed tube 54, a bleed hole 58 is formed at which, under the pressure gradient functionally existing at the bottom of the manifold 4 on the low-pressure side, the liquid phase enriched with lubricating oil is taken in and transported away together with the gaseous phase in the immersed tube 54.

Figure 7:
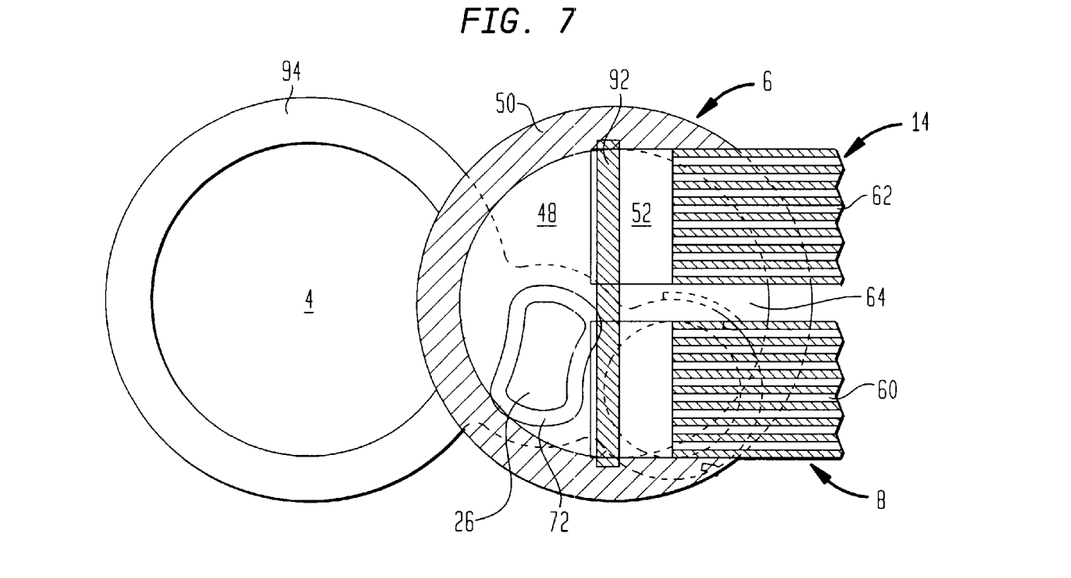
FIG. 7 shows a representation, as an enlarged part cross section, of connection conditions corresponding to those in FIG. 6, but with the first and the second heat-exchange tubes having the same orientation.
Figure 8:
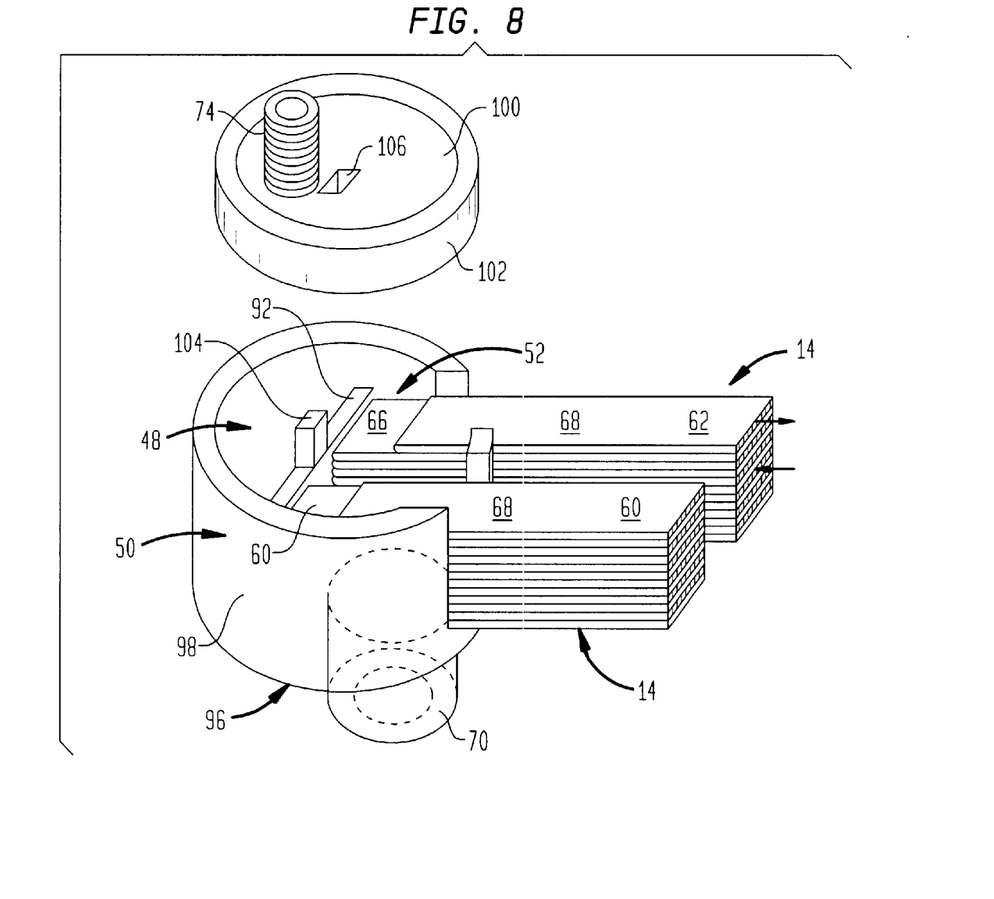
FIG. 8 shows, again on an enlarged scale, a partly exploded representation in the case when the manifold housing of the inner heat exchanger together with the cover on the end side are arranged according to FIG. 7.

As can also be seen in more detail from FIGS. 7 and 8, the inner heat exchanger 6, whose bank of second heat-exchange tubes 14 has refrigerant applied to it in the manner of a counter-current heat exchanger, has the following basic structure in both embodiments of FIGS. 1 and 2:

In the gas cooler 2 and in the inner heat exchanger 6, flat tubes which are designed identically, in terms of their outer contour and preferably also in inner tube cross section, are used as the first heat-exchange tubes 8 of the gas cooler 4 and as the second heat-exchange tubes 14 of the inner heat exchanger 6.

In this case, as indicated in FIG. 7, the bank of first heat-exchange tubes 8 extending in the longitudinal direction of the gas cooler 2, and a bank of a first stack 60 of second flat tubes 14 of the inner heat exchanger 6, are spatially covered in the vertical direction so that the edges of the first and second flat tubes 8 and 14 are vertically flush with one another.

In the inner heat exchanger 6, a second stack 62 of inner heat-exchange tubes 14, which is constructed identically to the first stack 60, is arranged laterally next to the first stack 60 of second heat-exchange tubes 14. An access opening 64 for refrigerant, arranged centrally between the two stacks 60 and 62, is left free between the two stacks 60 and 62. It can be seen from FIG. 7 that the two stacks 60 and 62 have a total width, including the access opening 64, which corresponds approximately to the free internal diameter of the manifold 50 of the inner heat exchanger 6, and by the dimension of the central access opening 64 is more than twice as wide as the bank of first heat-exchange tubes 8 of the gas cooler 2. The shell 50 of the inner heat exchanger 4, for its part, has about the same external dimension as the housing 94 of the manifold 4 on the low-pressure side which is configured with a circular contour, so that in this regard the two elements 50 and 94 have identical installation depths in the motor vehicle. This consistency of the installation depths makes it possible, with the two stacks 60 and 62 of second heat-exchange tubes, moreover, for the height of the respective stack to be halved in comparison with a single stack while having the same performance.

Further, the access opening 64 also has a channel function. This is because flat tubes 66 with relatively large length and flat tubes 68 with relatively short length alternate in both stacks 60 and 62. The flat tubes 66 being of relatively great length are in this case connected in the respective manifold 50 so as to communicate with its low-pressure side 48 which is remote from the flat tubes, while the flat tubes having shorter length open so as to communicate in the high-pressure side 52 of the manifold 50, and they communicate through a connection adaptor 70 with the neighboring chamber 20 in the distribution or manifold tube 16. The low-pressure side 48 communicates via a connection adaptor 72 with the intermediate channel 26 in the embodiment of FIG. 1, and with the immersed tube 54 in the embodiment of FIG. 2. In this case, the two connection adaptors 70 and 72 describe the respective inlet side of the inner heat exchanger. On the outlet side, the low-pressure side 48 of the inner heat exchanger is connected to the refrigerant circuit via an outer connection adaptor 74, and the high-pressure side 52 by an outer connection adaptor 76, as can also be seen in more detail from FIG. 4 with the representation of the refrigerant circuit.

Figure 4:
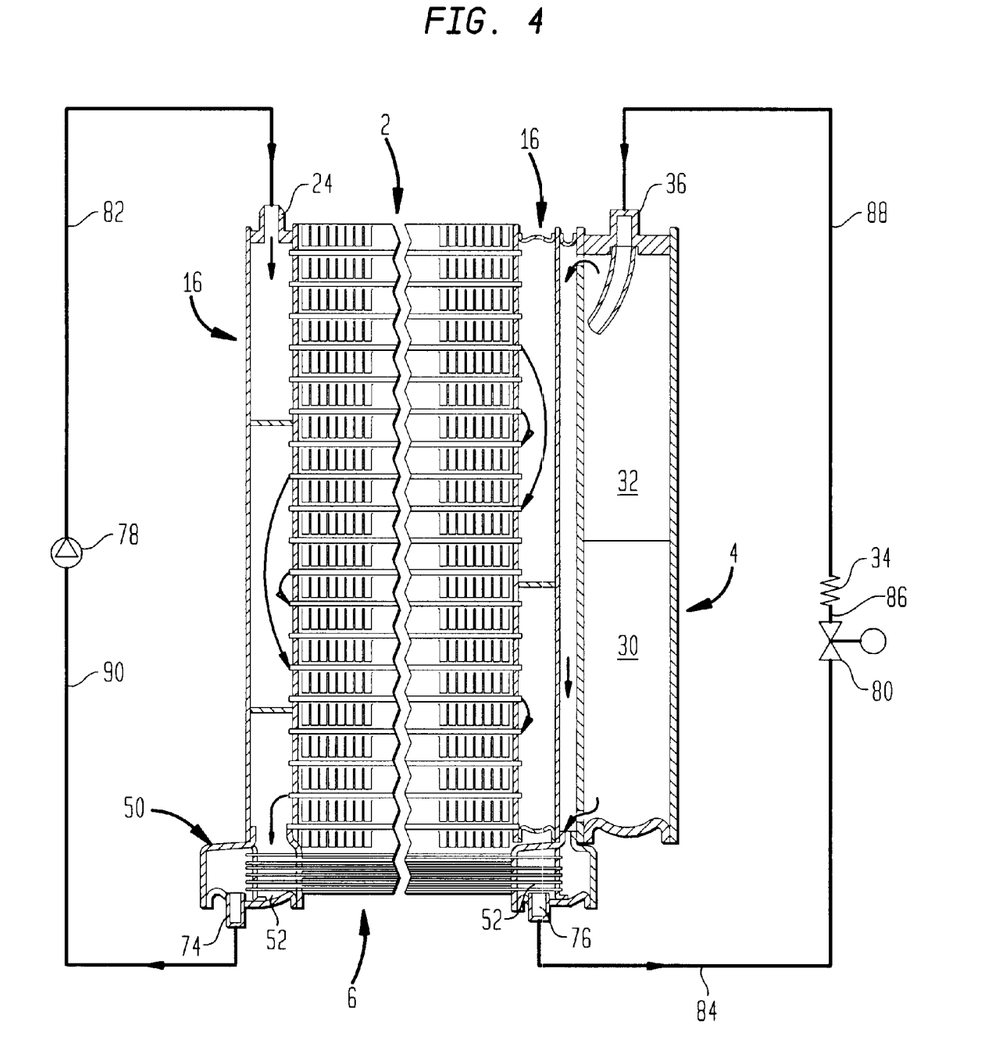
FIG. 4 shows the gas cooler according to FIG. 1 with its refrigerant circuit being included in the layout.

FIG. 4 represents the refrigerant circuit in the case of a unit according to FIG. 1 in the flow direction. The refrigerant is in this case fed from the compressor 78 via a high-pressure line 82 to the inlet adaptor 24 for the gas cooler, and re-emerges from the inner heat exchanger 6 at the connection adaptor 76 on the high-pressure side, and is then fed by the liquid line 84 on the high-pressure side to a throttle device 80, which reduces the high pressure of the refrigerant to low pressure and, via a low-pressure line 86, supplies an evaporator 34 which converts the liquid refrigerant at least partly into the gaseous phase and feeds it via the line 88 on the low-pressure side to the connection adaptor 36 on the upper cover 38 of the manifold 4 on the low-pressure side. After having flowed through the manifold 4 on the low-pressure side and through the inner heat exchanger 6, the gaseous phase of the refrigerant re-emerges from the outlet-side connection adaptor 74 of the inner heat exchanger 6 and is fed back in a closed circuit to the entry of the compressor 78 via the intake line 90 which is under low pressure.

In the manifold 50, the low-pressure side 48 and the high-pressure side 52 are respectively divided from one another in a leaktight manner by an intermediate wall 92 which is used as the tube bottom for the second heat-exchange tubes 14 having long ends.

As can be seen from FIG. 8, the housing 98 of the manifold 50, into which the intermediate wall 92 consisting of solder-tinned metal plate is fitted, is designed at one of its end sides with an integral end wall 96 which, for its part, merges integrally into the connection adaptor 70 on the high-pressure side which communicates with the high-pressure side 52 of the manifold 50 of the inner heat exchanger 6.

On the other end side, the housing 98 of the manifold 50 is closed with a separate cover 100 which has a rim 102 on the outer edge for brazing to the housing 98. The connection adaptor 74 for the low-pressure side 48 of the manifold 50, through which the refrigerant can be supplied to the low-pressure side 48 of the flat tubes 66 on the low-pressure side, or discharged from them, is further arranged in the cover 100.

In order to make it possible for the positioning adjusted when assembling the cover 100 with the housing 98 to be maintained during the brazing process as well, a stud 104 is placed on the intermediate wall 92 and a hole 106, through which the stud 104 engages and is secured in order to fix the position after assembly, is made in the cover 100.

Figure 6:
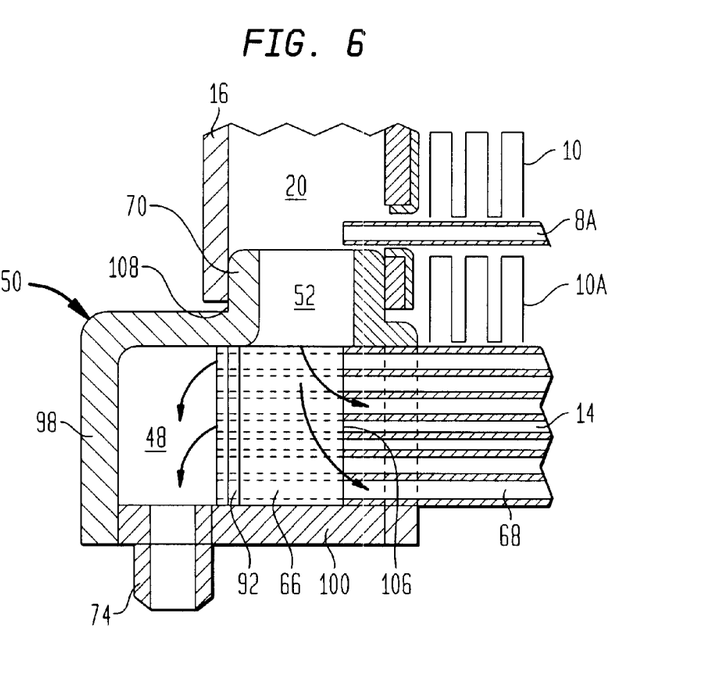
FIG. 6 shows a longitudinal part section, on an enlarged scale, in the region where the distribution or manifold tube of the gas cooler is connected to the manifold of an inner heat exchanger, in the case when the second heat-exchange tubes of the inner manifold are positioned transversely at right angles in relation to the first heat-exchange tubes of the gas cooler.

While in FIGS. 7 and 8 the second heat-exchange tubes 14 are arranged with their flat sides parallel to the first heat-exchange tubes 8, FIG. 6 represents an arrangement of the aforementioned flat tubes rotated through 90°. In this embodiment, the refrigerant which is under high pressure in the chamber 52 on the high-pressure side of the manifold 50 between the parallel flat sides of the flat tubes 66 having relatively large length can enter the inlet opening 106 of the flat tubes 68 having relatively small length. The flat tubes 68 and 66 are, like in the embodiment according to FIG. 8, preferably stacked alternately on one another, although other arrangements are also possible, e.g. two flat tubes 68 combined with one flat tube 66 in each case.

Through the embodiment corresponding to FIG. 6, it is possible to do without the central access opening 64, so that the stack of second heat-exchange tubes 14 can have essentially the same height as the overall depth of the gas cooler 2, measured in the access direction of the ambient air, which is given by the length of the first heat-exchange tubes 8 (measured in the direction of the flat sides).

The structure of the manifold 50 is similar to the embodiment in FIG. 8.

The only difference is that in FIG. 6 the cover 100 is provided as a flat part without a rim 102 for brazing to the housing 98.

For brazing the manifold 50 to the distributor of the manifold tube 16 via the connection adaptor of the high-pressure side 70, a braze ring 108 may also be inserted between the two parts before the brazing.

Figure 5:
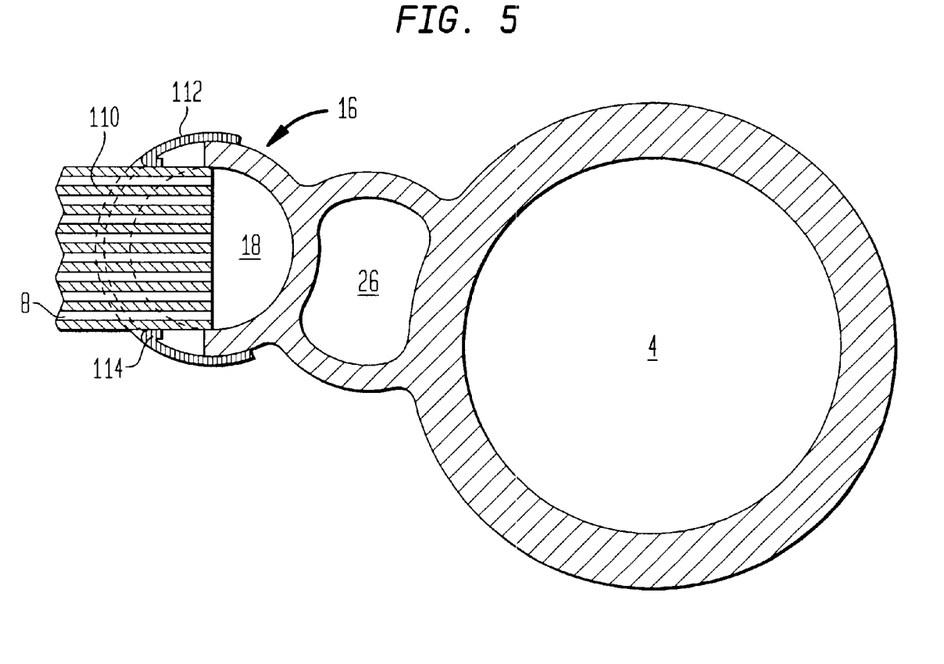
FIG. 5 shows a part cross section, on an enlarged scale, through the manifold container, the intermediate channel and a distribution or manifold tube of the gas cooler.

In order to obtain a pressure-stable structure, as far as possible independent of the brazing quality, of the distribution or manifold tube 16, of the intermediate channel 26 and of the manifold 4 on the low-pressure side, as represented in FIG. 5 all 3 parts mentioned above can be made from an integral extruded part.

In order to accommodate the first heat-exchange tubes 8, tube-holder slots 110 are made in a process subsequent to the extrusion process, into which slots the tube ends of the first heat-exchange tubes 8 engage either directly or indirectly via an additional bottom plate 112, which may also be provided with a flange 114 for better brazing to the first heat-exchange tubes 8. In the case when a bottom plate 112 is employed, it may also be used to provide the tinning which is needed for brazing the extruded first heat-exchange tubes 8 to the extruded manifold and distribution tube 16, the tinning being applied as a coating on both sides of the bottom plate 112.

Figure 3A:
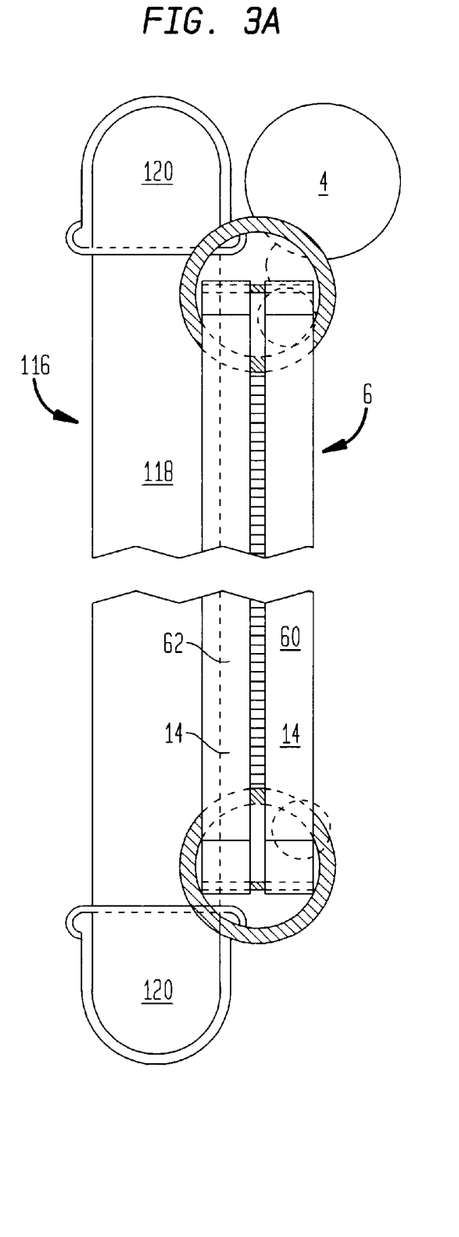
FIGS. 3a and 3b show a partly sectional outline diagrammatic representation of two alternative embodiments of a combination of a unit of the type in FIG. 1 with an engine cooler, with connection to form a common unit via common ribbing of the gas cooler and of the engine cooler, with the viewing direction extending upward in the normal installation position and a longitudinal-sectional representation of the inner heat exchanger also being indicated.
Figure 3B:
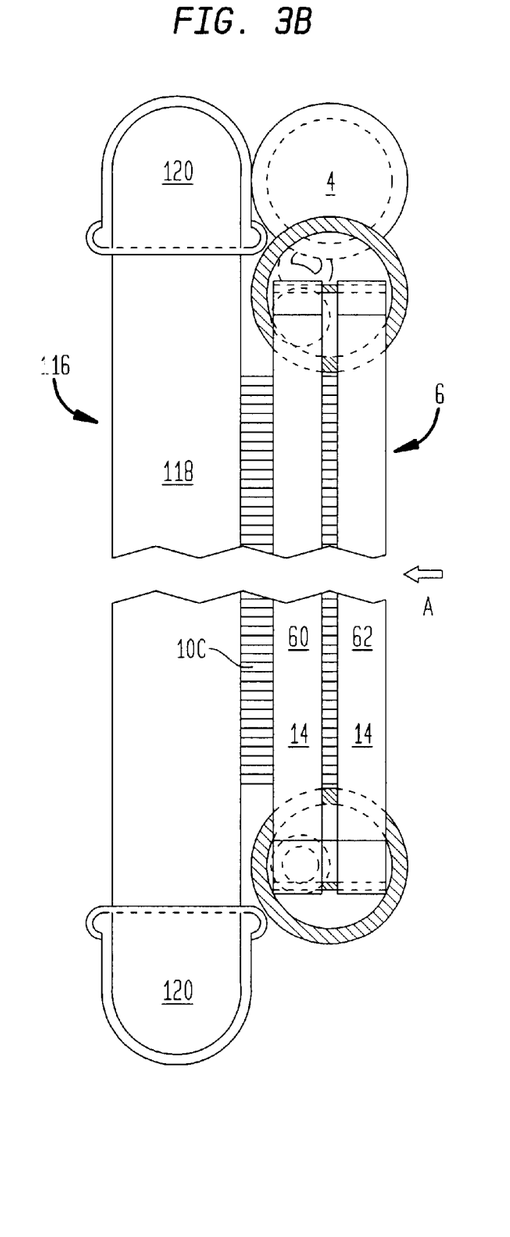

FIGS. 3a and 3b represent the combination of a heat exchanger according to FIG. 1 with an engine cooler viewed parallel to the longitudinal axis of the manifold on the low-pressure side. Since, in the installed position, the manifold 4 on the low-pressure side as well as the distribution and manifold tubes 16 are always arranged vertically, the representation in FIGS. 3a and 3b also corresponds to looking upward in the installed position against the direction of gravity. To represent the function of the inner heat exchanger 6 better, the latter is also represented in longitudinal section. FIGS. 3a and 3b show in detail an engine cooler 116, which has a heat-exchanger network 118 and manifold/distribution boxes 120 through which the refrigerant is supplied to or discharged from the individual heat-exchange tubes of the heat-exchanger network 118. The elements of the heat exchanger according to the invention are represented similarly to the embodiment according to FIG. 1 and FIG. 8.

Through a corresponding design embodiment of the intermediate channel, the distribution or manifold tube 16 of the gas cooler is then further arranged likewise as close as possible to the heat-exchanger network 118 in the air direction A, in order to keep the common overall depth of the unit made up of the engine cooler 116 and the gas cooler 2 as small as possible in the air direction A.

Through the double-row embodiment of the inner heat exchanger 6 in the air direction A, with a first and second stack 60, 62, the overall depth of the heat exchanger according to the invention according to FIG. 1 is twice as great in the height range of the inner heat exchanger 6 as in the height range of the gas cooler 2. According to FIGS. 3a, b there are then two preferred possible arrangements of the additional tube row, which increases the overall depth of the gas cooler and is denoted by the stack 62 of second heat-exchange tubes 14.

In FIG. 3a, the first stack 60 of second heat-exchange tubes 14, which is arranged vertically flush with the first heat-exchange tubes 8 of the gas cooler 2, is fitted directly in front of the heat-exchanger network 118 in the air direction A with appropriate tolerances, while the second stack 62 of inner heat-exchange tubes 14 is arranged under the heat-exchanger network 118 of the engine cooler 116 in the installed position.

In this embodiment 3a, parts of the manifold 50 of the inner heat exchanger 6 are likewise arranged under the heat-exchanger network 118 or under the manifold boxes 120 of the engine cooler 116.

This embodiment is preferable when the overall depth in the air direction A for a second stack 62 is not available in the height range of the inner heat exchanger 6, and when the through-flow on the air side is in any case so disrupted by vehicle-specific fitments in the height range of the inner heat exchanger 6 that reducing the overall height of the heat-exchanger network 118, measured in the longitudinal direction of the manifold boxes 120, does not lead to any reduction in performance.

The embodiment corresponding to FIG. 3b is to be preferred when there is both good through-flow on the air side and sufficient space in the air direction A for the second additional stack 62 of inner heat-exchange tubes 14 in the height range of the inner heat exchanger 6.

If the spacing of the neighboring flat sides between the first heat-exchange tubes 8 of the gas cooler 2 is chosen to be similar to the spacing of the heat-exchange tubes of the heat-exchanger network 118, it is possible to connect the two flat tubes with common ribbing 10c using zigzag sheets, and they may also optionally have common connecting walls to one another.

If the spacing of the neighboring flat sides between the first heat-exchange tubes 8 of the gas cooler 2 is chosen to be similar to the spacing of the heat-exchange tubes of the heat-exchanger network 118, it is possible to connect the two flat tubes with common ribbing 10c using zigzag sheets.

The heat-exchanger unit according to the invention according to FIG. 1 or FIG. 2, and the heat-exchanger network 118 of the engine cooler 116, can therefore be brazed completely during production in a single process, so that on the one hand brazing time can be saved and, on the other hand, further fastening of the heat-exchanger unit according to the invention to the engine cooler 116 is no longer necessary.

Through corresponding louver cuts, which are made transversely with respect to the air direction A in the zigzag sheets 10c, any undesired heat flow from the heat-exchanger network 118 onto the flat tubes of the gas cooler 8 is greatly limited, so it is even possible to operate with a temperature level which differs between the engine coolant circuit and the gas cooler.

From the units which have been described, made up of the gas cooler 2, the manifold 4 on the low-pressure side and the inner heat exchanger 6, it is clear that the connection of the gas cooler 2 to the inner heat exchanger 6 and to the manifold 4 on the low-pressure side is free from spacing tube connections, and that the gas cooler 2 moreover has common connecting walls both with the manifold 4 on the low-pressure side, cf in particular FIG. 5, and with the inner heat exchanger 6, cf in particular FIGS. 6 to 8.

What is claimed is:

1. A high pressure gas cooler for a motor-vehicle air-conditioning system having a refrigerant circuit comprising, in the flow direction of the refrigerant, the gas cooler, an inner heat exchanger operable to exchange heat between the high-pressure and low-pressure sides, wherein the gas cooler and the inner heat exchanger are combined to form a single unit, wherein said gas cooler exhibits a bank of first heat-exchange tubes of the gas cooler, which is designed as a cross-current heat exchanger and has a horizontal basic alignment of the heat-exchange tubes in the normal installation position in the motor-vehicle, and which exhibits a bank of second heat-exchange tube s of the inner heat exchanger, which has at least almost fully or essentially the same basic alignment as the first heat-exchange tubes and is designed as a counter-current heat exchanger.

2. The gas cooler of claim 1, wherein the bank of second heat-exchange tubes is arranged above the bank of first heat-exchange tubes.

3. The gas cooler of claim 1, wherein the bank of second heat-exchange tubes is arranged below the bank of first heat-exchange tubes.

4. The gas cooler of claim 1, wherein, optionally with the exception of ribbing, the second heat-exchange tubes are designed identically with the first heat-exchange tubes.

5. A high pressure gas cooler for a motor-vehicle air-conditioning system having a refrigerant circuit comprising, in the flow direction of the refrigerant, the gas cooler, an inner heat exchanger operable to exchange heat between the high-pressure and low-pressure sides, wherein the gas cooler and the inner heat exchanger are combined to form a single unit, wherein the inner heat exchanger has a bank of (second) heat-exchange tubes, brazed directly to one another, which are allocated alternately to the high-pressure and to the low-pressure sides.

6. The gas cooler of claim 5, wherein, when both the first and the second heat-exchange tubes are designed as flat tubes, the orientation of the flat sides of the first and of the second heat-exchange tubes is the same, wherein the second heat-exchange tubes have different lengths of their ends depending on whether they are allocated to the high-pressure side or to the low-pressure side, and in that the arrangement of the second heat-exchange tubes is interrupted by at least one, preferably a single centrally arranged, access opening for the refrigerant in order to apply it to the second heat-exchange tubes having the smaller length of their ends.

7. The gas cooler of claim 6, wherein the bank of second heat-exchange tubes is made of at least two, preferably identical, separate banks of flat tubes stacked on one another.

8. The gas cooler of claim 5, wherein, when both the first and the second heat-exchange tubes are designed as flat tubes, the orientation of the flat sides of the first and of the second heat-exchange tubes is oblique, preferably at right angles to one another, and in that the second heat-exchange tubes have different lengths of their ends depending on whether they are allocated to the high-pressure side or to the low-pressure side.

9. A high pressure gas cooler for a motor-vehicle air-conditioning system having a refrigerant circuit comprising, in the flow direction of the refrigerant, the gas cooler, an inner heat exchanger operable to exchange heat between the high-pressure and low-pressure sides, wherein the gas cooler and the inner heat exchanger are combined to form a single unit, wherein the gas cooler and/or the inner heat exchanger has a bank of first and/or second heat-exchange tubes, the first and/or second heat-exchange tubes being flat tubes.

10. A high pressure gas cooler for a motor-vehicle air-conditioning system having a refrigerant circuit comprising, in the flow direction of the refrigerant, the gas cooler, an inner heat exchanger operable to exchange heat between the high-pressure and low-pressure sides, wherein the gas cooler and the inner heat exchanger are combined to form a single unit, wherein the inner heat exchanger has, at each of the two ends of a bank of (second) heat-exchange tubes, a manifold which is subdivided into at least two chambers, one of which is allocated to the high-pressure side and the other to the low-pressure side.

11. The gas cooler of claim 10, wherein the manifold is a structure having a housing, which is preferably a die-cast or pressed part, and a separating wall, made of another material, preferably solder-tinned metal plate, fitted in the housing between the high-pressure side and the low-pressure side.

12. The gas cooler of claim 11, wherein the separating wall between the high-pressure side and the low-pressure side of the manifold is at the same time the tube bottom for those of the (second) heat-exchange tubes allocated to the high-pressure side or to the low-pressure side which communicate with the manifold chamber remote from these heat-exchange tubes.

13. The gas cooler of claim 11, wherein the housing of the manifold is designed at one of its end sides with an integral end wall which, for its part, is designed integrally with an adaptor connecting to the gas cooler or the manifold on the low-pressure side, and in that the housing of the manifold has, at its other end side, a separate cover which is provided with a refrigerant outlet.

14. A high pressure gas cooler for a high-pressure refrigerant circuit of a motor-vehicle air-conditioning system. the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit, wherein said gas cooler exhibits a bank of first heat-exchange tubes of the gas cooler, which is designed as a cross-current heat exchanger and has a horizontal basic alignment of the heat-exchange tubes in the normal installation position in the motor-vehicle, and which exhibits a bank of second heat-exchange tubes of the inner heat exchanger which has at least almost fully or essentially the same basic alignment as the first heat-exchange tubes and is designed as a counter-current heat exchanger.

15. The gas cooler of claim 14, wherein the bank of second heat-exchange tubes is arranged above the bank of first heat-exchange tubes.

16. The gas cooler of claim 14, wherein the bank of second heat-exchange tubes is arranged below the bank of first heat-exchange tubes.

17. The gas cooler of claim 14, wherein, optionally with the exception of ribbing, the second heat-exchange tubes are designed identically with the first heat-exchange tubes.

18. The gas cooler of claim 14, wherein the inner heat exchanger has, at each of the two ends of a bank of (second) heat-exchange tubes, a manifold which is subdivided into at least two chambers, one of which is allocated to the high-pressure side and the other to the low-pressure side.

19. The gas cooler of claim 18, wherein the manifold is a structure having a housing, which is preferably a die-cast or pressed part, and a separating wall, made of another material, preferably solder-tinned metal plate, fitted in the housing between the high-pressure side and the low-pressure side.

20. The gas cooler of claim 19, wherein the separating wall between the high-pressure side and the low-pressure side of the manifold is at the same time the tube bottom for those of the (second) heat-exchange tubes allocated to the high-pressure side or to the low-pressure side which communicate with the manifold chamber remote from these heat-exchange tubes.

21. The gas cooler of claim 19, wherein the housing of the manifold is designed at one of its end sides with an integral end wall which, for its part, is designed integrally with an adaptor connecting to the gas cooler or the manifold on the low-pressure side, and in that the housing of the manifold has, at its other end side, a separate cover which is provided with a refrigerant outlet.

22. The gas cooler of claim 14, wherein the manifold on the low-pressure side extends transversely with respect to the (first) heat-exchange tubes of the gas cooler.

23. The gas cooler of claim 14, wherein the connection of the gas cooler to the inner heat exchanger and/or to the manifold on the low-pressure side is free from spacing tube connections.

24. The gas coolers of claim 23, wherein the gas cooler and the inner heat exchanger and/or the manifold on the low-pressure side have common connecting walls to one another.

25. A high pressure gas cooler for a high-pressure refrigerant circuit of a motor-vehicle air-conditioning system, the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit, wherein the inner heat exchanger has a bank of (second) heat-exchange tubes, brazed directly to one another, which are allocated alternately to the high-pressure and to the low-pressure sides.

26. The gas cooler of claim 25, wherein, when both the first and the second heat-exchange tubes are designed as flat tubes, the orientation of the flat sides of the first and of the second heat-exchange tubes is the same, wherein the second heat-exchange tubes have different lengths of their ends depending on whether they are allocated to the high-pressure side or to the low-pressure side, and in that the arrangement of the second heat-exchange tubes is interrupted by at least one, preferably a single centrally arranged, access opening for the refrigerant in order to apply it to the second heat-exchange tubes having the smaller length of their ends.

27. The gas cooler of claim 26, wherein the bank of second heat-exchange tubes is made of at least two, preferably identical, separate banks of flat tubes stacked on one another.

28. The gas cooler of claim 25, wherein, when both the first and the second heat-exchange tubes are designed as flat tubes, the orientation of the flat sides of the first and of the second heat-exchange tubes is oblique, preferably at right angles to one another, and in that the second heat-exchange tubes have different lengths of their ends depending on whether they are allocated to the high-pressure side or to the low-pressure side.

29. A high pressure gas cooler for a high-pressure refrigerant circuit of a motor-vehicle air-conditioning system, the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit, wherein the gas cooler and/or the inner heat exchanger has a bank of first and/or second heat-exchange tubes, the first and/or second heat-exchange tubes being flat tubes.

30. A high pressure gas cooler for a high-pressure refrigerant circuit of a motor-vehicle air-conditioning system, the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit, the manifold on the low-pressure side extending transversely with respect to the (first) heat-exchange tubes of the gas cooler. wherein the manifold on the low-pressure side is connected to the gas cooler via an intermediate channel which, depending on whether the inner heat exchanger is arranged above or below the gas cooler, feeds the refrigerant gas phase emerging from the gas cooler upward to the inner heat exchanger or feeds the gaseous phase of the refrigerant, separated from the liquid phase of the refrigerant in the manifold on the low-pressure side, downward to the inner heat exchanger.

31. The gas cooler of claim 30, wherein at least the shell of the manifold on the low-pressure side, the shell of the intermediate channel and the shell of a distribution or manifold tube of the gas cooler are made integrally, preferably as an extruded part.

32. The gas cooler of claim 30, wherein at least one through-opening, for recycling lubricant of the compressor which has entered, is formed between the manifold on the low-pressure side and the intermediate channel.

33. A high pressure gas cooler for a high-pressure refrigerant circuit of a motor-vehicle air-conditioning system, the refrigerant circuit having, in the flow direction of the refrigerant, an inner heat exchanger exchanging heat between the high-pressure and low-pressure sides, which communicates via the low-pressure side of the inner heat exchanger with the intake side of the compressor, wherein the gas cooler, the inner heat exchanger and the manifold on the low-pressure side are combined to form a single unit, where the gas cooler and an engine cooler of the motor vehicle are combined to form a single unit.

34. The gas cooler of claim 33, wherein the gas cooler and the engine cooler have common ribbing of their respective heat-exchange tubes and/or common end plates.

35. A supercritical $CO_2$ high pressure refrigerant circuit of a motor vehicle air-conditioning system comprising, in the flow direction of the refrigerant, a compressor, a gas cooler combined with an inner heat exchanger to form a single unit, said inner heat exchanger exchanging heat between the high-pressure and low-pressure sides, a throttle device, an evaporator and manifold on the low-pressure side, which communicates via the low-pressure side of the inner heat exchanger with the intake side of the compressor, wherein the inner heat exchanger has a bank of (second) heat-exchange tubes, brazed directly to one another, which are allocated alternately to the high-pressure and to the low-pressure sides.

36. A supercritical $CO_2$ high-pressure refrigerant circuit of a motor vehicle air-conditioning system comprising, in the flow direction of the refrigerant, a compressor, a gas cooler, an inner heat exchanger, said inner heat exchanger being operable to exchange heat between high-pressure and low-pressure sides, a throttle device, an evaporator and a manifold on the low-pressure side, which communicates via the low-pressure side of the inner heat exchanger with the intake side of the compressor, where the gas cooler, the inner heat exchanger and the manifold on the low-pressure side are combined to form a single unit, and the inner heat exchanger has a band of (second) heat-exchange tubes, brazed directly to one another which are allocated alternately to the high-pressure and to the low-pressure sides.

37. A high pressure gas cooler for a refrigerant circuit of a motor-vehicle air-conditioning system, the refrigerant circuit having, in the flow direction of the refrigerant, the gas cooler, an inner heat exchanger exchanging heat between the high-pressure and low-pressure sides, and a manifold on the low-pressure side, which communicates via the low-pressure side of the inner heat exchanger with the intake side of the compressor, wherein the gas cooler and the manifold on the low-pressure side are combined to form a single unit, and the inner heat exchanger has a bank of (second) heat-exchange tubes, brazed directly to one another, which are allocated alternately to the high-pressure and to the low-pressure sides.

38. The gas cooler of claim 37, wherein the manifold on the low-pressure side extends transversely with respect to the (first) heat-exchange tubes of the gas cooler.

39. The gas cooler of claim 37, wherein the connection of the gas cooler to the inner heat exchanger and/or to the manifold on the low-pressure side is free from spacing tube connections.

40. The gas cooler of claim 39, wherein the gas cooler and the inner heat exchanger and/or the manifold on the low-pressure side have common connecting walls to one another.

41. A high pressure gas cooler for a refrigerant circuit of a motor-vehicle air-conditioning system, the refrigerant circuit having, in the flow direction of the refrigerant, the gas cooler, an inner heat exchanger exchanging heat between the high-pressure and low-pressure side, which communicates via the low-pressure side of the inner heat exchanger with intake side of a compressor, wherein the gas cooler and a manifold on the low-pressure side are combined to form a single unit, the manifold on the low-pressure side extending transversely with respect to the (first) heat-exchange tubes of the gas cooler, wherein the manifold on the low-pressure side is connected to the gas cooler via an intermediate channel which, depending on whether the inner heat exchanger is arranged above or below the gas cooler, feeds the refrigerant gas phase emerging from the gas cooler upward to the inner heat exchanger or feeds the gaseous phase of the refrigerant, separated from the liquid phase of the refrigerant in the manifold an the low-pressure side, downward to the inner heat exchanger.

42. The gas cooler of claim 41, wherein at least the shell of the manifold on the low-pressure side, the shell of the intermediate channel and the shell of a distribution or manifold tube of the gas cooler are made integrally, preferably as an extruded part.

43. The gas cooler of claim 41, wherein at least one through-opening, for recycling lubricant of the compressor which has entered, is formed between the manifold on the low-pressure side and the intermediate channel.

44. A supercritical $CO_2$ high pressure refrigerant circuit of a motor vehicle air-conditioning system comprising, in the flow direction of the refrigerant, a compressor, a gas cooler, an inner heat exchanger, said inner heat exchanger being operable to exchange heat between high-pressure and low-pressure sides, a throttle device, an evaporator and a manifold on the low-pressure side, which communicates via the low-pressure side of the inner heat exchanger with the intake side of the compressor, wherein the gas cooler and the low-pressure manifold are combined to form a single unit, and the inner heat exchanger has a bank of (second) heat-exchange tubes, brazed directly to one another, which are allocated alternately to high-pressure and to the low-pressure sides.

* * * * *